United States Patent
Keller et al.

(10) Patent No.: US 10,429,210 B1
(45) Date of Patent: Oct. 1, 2019

(54) BIREFRINGENCE DEFORMATION SENSING APPARATUS HAVING A CONTROLLER TO INSTRUCT THE FUNCTION OF A TRANSMITTER AND A RECEIVER

(71) Applicant: Facebook Technologies, LLC, Menlo Park, CA (US)

(72) Inventors: Sean Jason Keller, Kirkland, WA (US); Tristan Thomas Trutna, Seattle, WA (US); David R. Perek, Bellevue, WA (US); Bruce A. Cleary, III, Seattle, WA (US); Brian Michael Scally, Seattle, WA (US)

(73) Assignee: Facebook Technologies, LLC, Menlo Park, CA (US)

( * ) Notice: Subject to any disclaimer, the term of this patent is extended or adjusted under 35 U.S.C. 154(b) by 152 days.

(21) Appl. No.: 15/709,798

(22) Filed: Sep. 20, 2017

Related U.S. Application Data

(60) Provisional application No. 62/396,938, filed on Sep. 20, 2016.

(51) Int. Cl.
| | | |
|---|---|---|
| *G01D 5/34* | (2006.01) | |
| *G06F 3/01* | (2006.01) | |
| *G01D 5/353* | (2006.01) | |

(52) U.S. Cl.
CPC ......... *G01D 5/344* (2013.01); *G01D 5/35351* (2013.01); *G06F 3/012* (2013.01); *G06F 3/014* (2013.01)

(58) Field of Classification Search
CPC ..... G01C 19/722; G01L 11/025; G01L 23/16; G02F 1/035; G02F 1/365
USPC ....................................... 250/227.14
See application file for complete search history.

(56) References Cited

U.S. PATENT DOCUMENTS 5,093,569 A * 3/1992 Krumboltz ............ G01L 9/0088
250/227.16

* cited by examiner

*Primary Examiner* — Que Tan Le
(74) *Attorney, Agent, or Firm* — Fenwick & West LLP

(57) ABSTRACT

A deformation sensing apparatus comprises a propagation channel, a transmitter coupled to a first end of the propagation channel, a receiver coupled to a second end of the propagation channel, and a controller. The propagation channel is deformable and the controller instructs the transmitter to transmit a signal, instructs the receiver to capture one or more measurements of the transmitted signal, and determines a bend in the propagation channel based on the one or more measurements. In one embodiment, the transmitter is a light source, the propagation channel is an optical fiber, and the receiver is a photodiode. The propagation channel is made of a material that has a variation in a refractive index responsive to applied mechanical stress. The deformation sensing apparatus may also include a polarizer positioned between the transmitter and the propagation channel and a wave plate positioned between the propagation channel and the receiver.

18 Claims, 8 Drawing Sheets

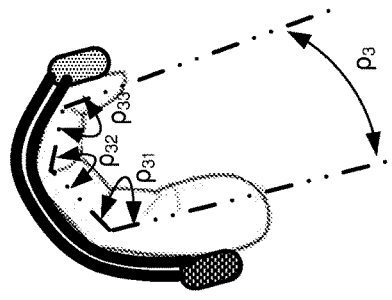
FIG. 6A
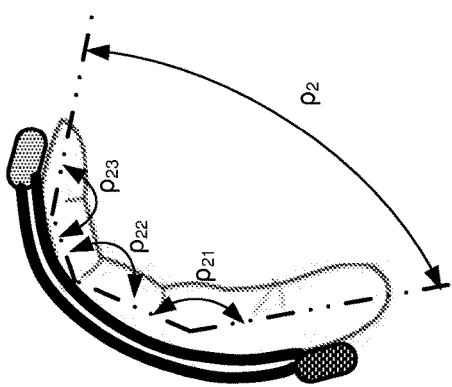
FIG. 6B
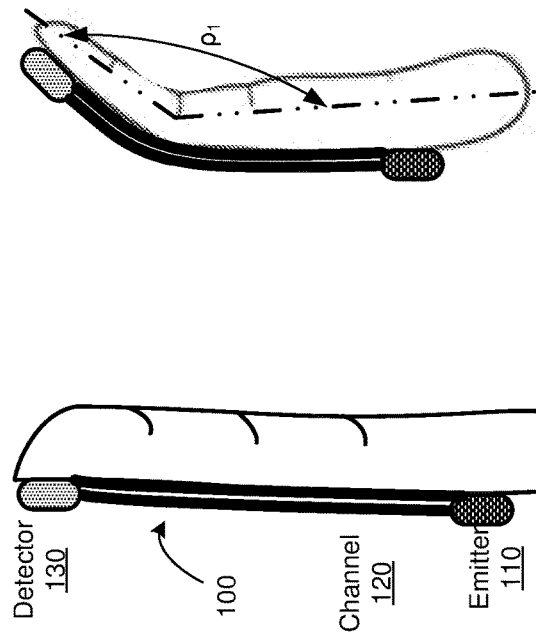
FIG. 6C
FIG. 6D
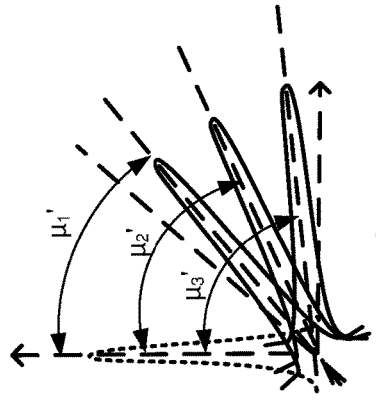
FIG. 6E
FIG. 6F
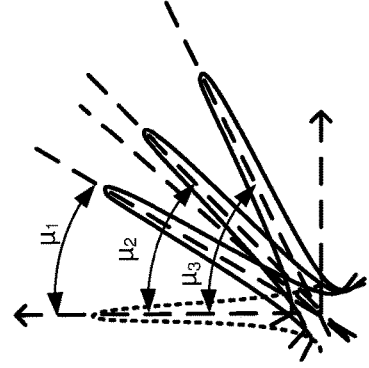
FIG. 6G
FIG. 6H
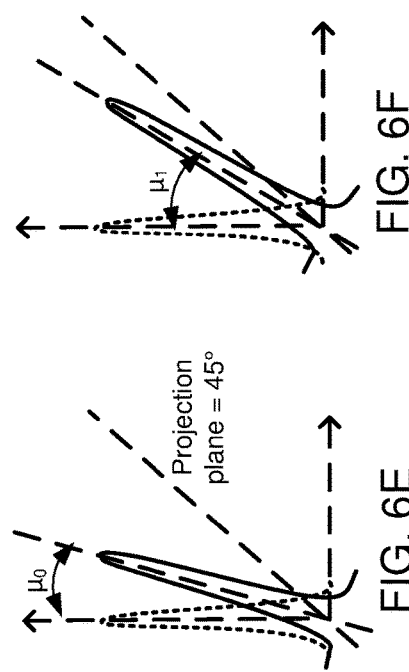

BIREFRINGENCE DEFORMATION SENSING APPARATUS HAVING A CONTROLLER TO INSTRUCT THE FUNCTION OF A TRANSMITTER AND A RECEIVER

CROSS REFERENCE TO RELATED APPLICATION

This application claims the benefit of U.S. Provisional Application No. 62/396,938 filed Sep. 20, 2016, which is incorporated by reference in its entirety.

BACKGROUND

The present disclosure generally relates to a wearable device for use in a virtual, augmented, or mixed reality (VR, AR, or MR) system, and more specifically relates to determining positions of a body part that the wearable device is worn on.

VR is a simulated environment created by computer technology and presented to a user, such as through a system. Similarly, AR or MR combine a computer-simulated environment with reality for presentation to a use through an AR/MR system. Typically, a VR/AR/MR system includes a headset that provides visual and audio information to the user. However, when wearing the headset, the user is unable to see the user's hands or interact with the simulated environment presented by the headset with the user's hands. Conventional systems create virtual hands in the simulated environment and use a hand tracking system to track motion and positions of the user's hands. However conventional hand tracking systems are often unable to accurately track positions of the user's fingers and thumbs, and thus are unable to track the precise movements of the user's digits and hand through space and time, causing poor representation of movement of the user's hand by virtual hands of the user within the simulated environment.

SUMMARY

A deformation sensing apparatus comprises a deformable energy propagation channel, an energy transmitter coupled to a first end of the propagation channel, and an energy receiver coupled to a second end of the propagation channel. In some embodiments, the transmitter is an emitter of electromagnetic energy and the receiver is a detector of electromagnetic energy. In some embodiments, the apparatus further comprises a polarizer positioned between the emitter and the propagation channel, and optionally a wave plate (e.g., a patterned retarder) placed between the propagation channel and the receiver.

In some embodiments, the energy propagation channel is a polycarbonate light pipe through which polarized light is transmitted from a proximate end (coupled to the emitter) to a distal end (coupled to the receiver). In some embodiments, the receiver is a photodiode at the distal end which captures the light. A measurement unit coupled to the receiver analyzes the received signal from the receiver and measures any change in polarization, and determines a bend in the light pipe based on the measured change in polarization. In some embodiments, the light pipe may be made of a multi-core fiber with different indexes of refraction to measure multiple bends of the pipe.

The deformation sensing apparatus may be used in wearable devices such as gloves, headsets, or any other fabric that conforms to a body part and can be used to detect and resolve movement of multiple spatial regions or portions of that body part.

In some embodiments, the orientations/bends of points on the wearable device (such as a glove) worn around a body part (e.g., fingers of a hand) are used to determine a state of the body part. For example, the orientations/bends of points on a glove (or other wearable device) are used to provide information about or to render a state of the hand (or other body part) in a VR (virtual reality) environment or VR world. For example, states of a hand (e.g., open, closed, pointing, gesturing, etc.) can be determined based on the bend angles of fingers or finger tips corresponding to the bends or orientations of points on the glove.

In one embodiment, a deformation sensing apparatus comprises a propagation channel, a transmitter coupled to a first end of the propagation channel, a receiver coupled to a second end of the propagation channel, and a controller. The propagation channel is deformable and the controller instructs the transmitter to transmit a signal, instructs the receiver to capture one or more measurements of the transmitted signal, and determines a bend in the propagation channel based on the one or more measurements. In one embodiment, the transmitter is a light source, the propagation channel is an optical fiber, and the receiver is a photodiode. The propagation channel is made of a material that has a variation in a refractive index responsive to applied mechanical stress.

BRIEF DESCRIPTION OF THE DRAWINGS

FIGS. 6A-6D include illustrations of a bend angle sensor worn on a finger and comprising a birefringence deformation sensing apparatus, according to one or more embodiments.

FIGS. 6E-6H illustrate amplitudes and timings of reflected waves within propagation channels of the birefringence deformation sensing apparatus with deformations applied as illustrated in FIGS. 6A-6D, for measuring bend angles of different joints of the finger, according to one or more embodiments.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Figure 1A:
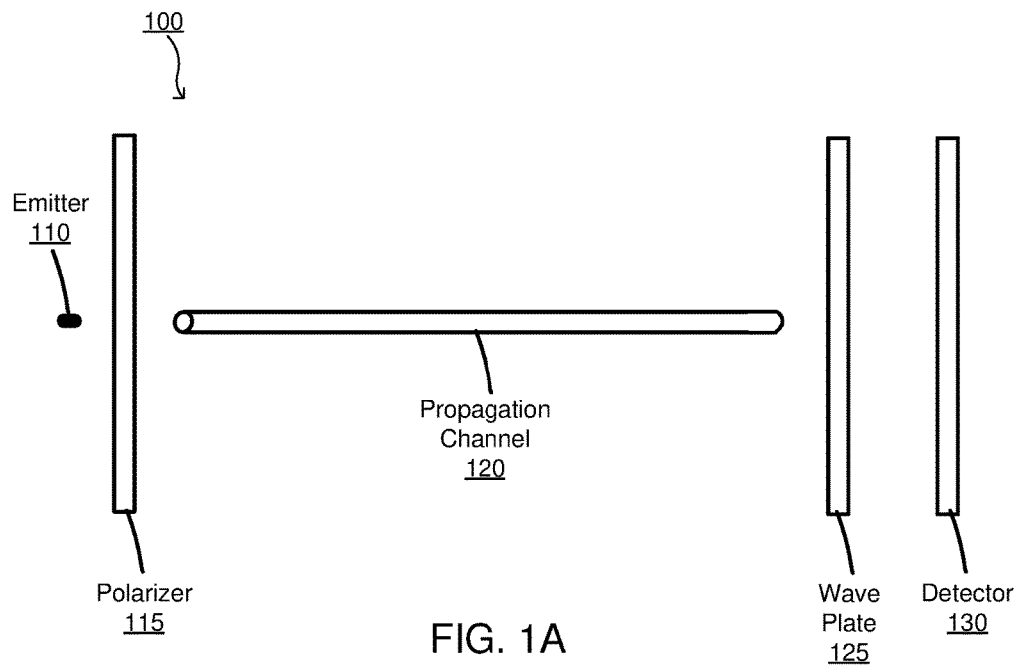
FIG. 1A illustrates a side view of a birefringence deformation sensing apparatus, according to some embodiments.
Figure 1B:
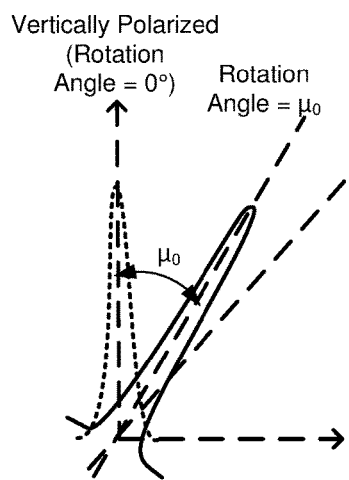
FIGS. 1B-1C illustrate received light waves corresponding to two orthogonal polarization directions, in the absence of a bend in the light propagation channel, according to one or more embodiments.
Figure 1C:
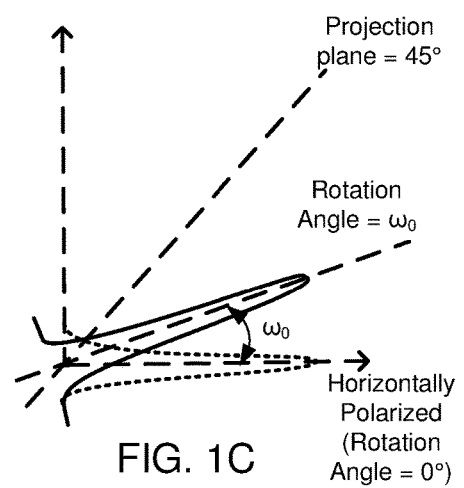

FIG. 1A illustrates a side view of a birefringence deformation sensing apparatus 100, according to some embodiments. FIGS. 1B-1C illustrate received light waves corresponding to two orthogonal polarization directions, in the absence of a bend in the light propagation channel, according to one or more embodiments.

As illustrated in FIG. 1A, the birefringence deformation sensing apparatus 100 comprises an emitter 110, a polarizer 115, a propagation channel (e.g., a deformable light pipe) 120, a wave plate (e.g., an analyzer) 125, and a detector 130.

In some embodiments, emitter 110 emits electromagnetic radiation (e.g., visible light) isotropically in all directions. Polarizer 115 polarizes light incident from the emitter 110 into one or more polarization directions. For example, as illustrated in FIGS. 1B-1C, the polarizer 115 may polarize the light incident into the channel 120 into vertical and horizontal polarization directions.

The propagation channel (e.g., a deformable light pipe) 120 optionally comprises optically isotropic material (e.g., glass that has a uniform index of refraction to incident light of a given polarization). Such glass becomes anisotropic in response to mechanical stress, resulting in variations in the refractive index inside the glass due to applied stress; also referred to as stress birefringence.

Plane polarized waves travel at different velocities in a transparent optical medium based on differences in polarization directions. The refractive indices ($n\|$ and $n\bot$) of as well as the propagation velocities in the transparent optical medium for different polarization directions are differently impacted by applied stress. In the absence of applied stress, vertically and horizontally polarized waves may undergo different amounts of optical rotation (e.g., angles $\mu_0$ and $\omega_0$, as shown in FIGS. 1B-1C) of their respective polarization directions.

Responsive to an applied mechanical stress, for electromagnetic radiation with polarization directions parallel and/or perpendicular to the direction of the mechanical stress the refractive indices are impacted as:

$$n\| = n_0 + \Delta n\| \quad (1)$$

$$n\bot = n_0 + \Delta n\bot \quad (2)$$

where $n_0$ is the refractive index of the isotropic (unstressed) medium, $\Delta n\|$ is a change in refractive index for light oscillating parallel to the direction of stress, and $\Delta n\bot$ is a change in refractive index for oscillating light perpendicular to the direction of stress.

For small mechanical stresses $\sigma$, changes in refractive index are proportional to the mechanical stress $\sigma$, and the respective differential quotients or proportionality constants (called the stress optical coefficients or photoelastic coefficients, $K\|$ and $K\bot$) can be represented as:

$$K\| = dn\|/d\sigma \quad (3)$$

$$K\bot = dn\bot/d\sigma \quad (4)$$

Stress birefringence of a propagation channel is expressed as a difference in refractive indices (e.g., $n\bot - n\bot$) for light exhibiting orthogonal polarizations, in response to applied stress. Stress birefringence, in turn, can be used to determine a measure of stress in the propagation channel, based on the following equation:

$$\Delta s = (n\| - n\bot) \cdot d = (K\| - K^{\Downarrow}) \cdot d \cdot \sigma \quad (5)$$

where $\Delta s$ is a difference in optical path between two incident plane waves (oscillation planes oriented parallel and perpendicular to the main axis of stress); d is the light path length in the propagation medium/channel; $n\|$ and $n\bot$ are refractive indices for oscillating light perpendicular and parallel, respectively, to the direction of stress; $K\|$ and $K\bot$ are stress optical coefficients or photoelastic coefficients; and $\sigma$ is the mechanical stress.

The optical path length difference ($\Delta s$) due to mechanical stress can be inferred using a wave plate or optical analyzer, based on angles of rotation that the different polarization vectors undergo responsive to the applied stress.

In some embodiments, a wave plate 125 (e.g., a quarter wave plate or optical analyzer) is oriented at a 45° angle to both polarization directions. Thus, the components of each polarization vector (vertical and horizontal) received from the propagation channel 120 can be decomposed along an axis of the wave plate (e.g., on the projection plane illustrated in FIGS. 1B and 1C). These projection measures can be first characterized without stress (as described with reference to FIGS. 2A and 3A) to determine a baseline rotation angle (e.g., $\mu_0$ or $\omega_0$) without stress. The projections measures obtained in the presence of stress (bend or flex) can be compared (as described with reference to FIGS. 2B-2C and 3B-3C) to determine a rotation angle of each of the polarization vectors due to the applied stress. From the differential rotation angles of the two polarization vectors, the optical path length difference ($\Delta s$) and the mechanical stress ($\sigma$) can be computed.

In some embodiments, a full-wave plate is introduced between the channel and the quarter wave plate to determine the sign of the stress (e.g., compression versus tensile; or direction of bend).

Figure 2A:
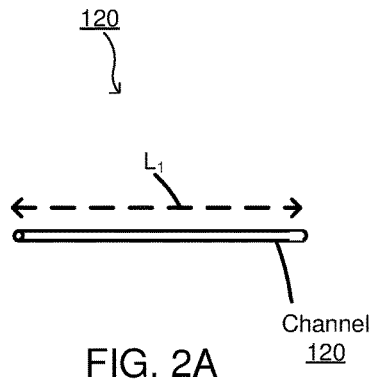
FIGS. 2A-2C illustrate a birefringence deformation sensing apparatus, with different measures of bends at a given point along a length-axis of the propagation channel, in accordance with one or more embodiments.
Figure 2B:
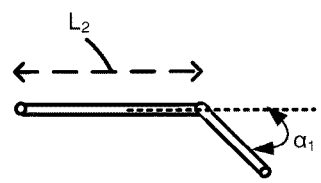
Figure 2C:
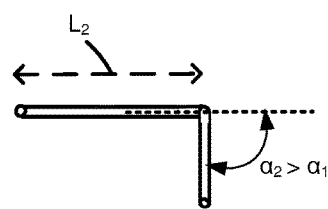

FIGS. 2A-2C illustrate a birefringence deformation sensing apparatus, with different measures of bends at a given point along a length-axis of the propagation channel, in accordance with one or more embodiments.

Figure 3A:
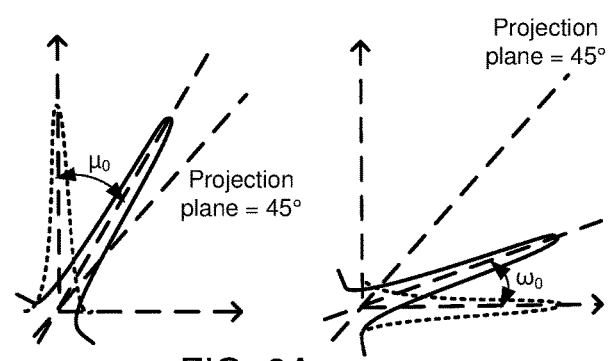
FIGS. 3A-3C illustrate signals obtained from the birefringence deformation sensing apparatus with deformations applied to the propagation channel as illustrated in FIGS. 2A-2C, in accordance with one or more embodiments.
Figure 3B:
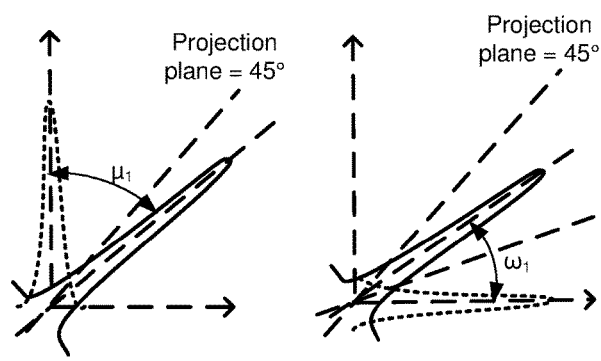
Figure 3C:
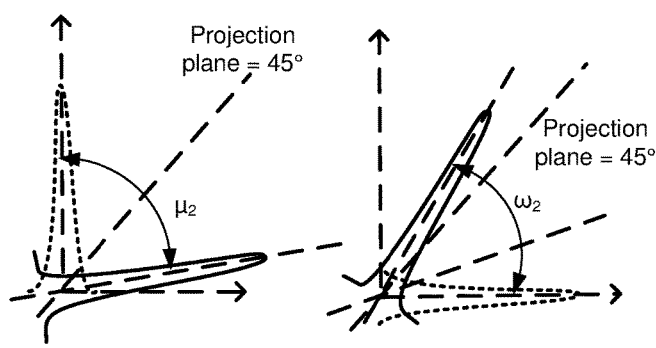

FIGS. 3A-3C illustrate magnitudes of polarized waves through the birefringence deformation sensing apparatus with deformations applied as illustrated in FIGS. 2A-2C, in accordance with one or more embodiments.

In some embodiments, the components of each polarization vector (vertical and horizontal) received from the propagation channel 120 can be decomposed along an axis of the wave plate 125 (e.g., onto the projection plane illustrated in FIGS. 3A-3C) to determine the rotation angle $\mu$ for the vertically polarized waves and/or rotation angle $\omega$ for the horizontally polarized waves.

These projection measures may be characterized without stress to determine a baseline rotation angle without stress (e.g., $\mu_0$ for the vertically polarized waves and/or $\omega_0$ for the horizontally polarized waves, as illustrated in FIGS. 2A and 3A).

As illustrated in FIGS. 2B, 3B and 2C, 3C, the angle of rotation of the vertically and horizontally polarized waves changes in response to a bend in the propagation channel.

Consequently, the projection measures of the vertically and horizontally polarized waves also change in the presence of stress (bend or flex).

For example, as shown in FIG. 2B, the optical channel 120 undergoes a bend (bend angle $\alpha_1$). Correspondingly, as shown in FIG. 3B, the vertically polarized light undergoes a rotation of $\mu_1$, which is distinct from the rotation $\mu_0$ (FIG. 3A) in the absence of a bend; and the horizontally polarized light undergoes a rotation of $\omega_1$, which is distinct from the rotation $\omega_0$ (FIG. 3A) in the absence of a bend.

The projections of the rotated polarized light on the projection plane of the analyzer or wave plate 125 also change as a function of rotation angles $\mu_1$ and $\omega_1$; and therefore as a function of bend angle $\alpha_1$. The projections can be compared to the projections pre-characterized without bend in the channel, to determine a bend angle of the channel 120 (e.g., bend angle $\alpha_1$, FIG. 2B).

As another example, and as shown in FIG. 2C, the optical channel 120 undergoes a bend (bend angle $\alpha_2$, different from bend angle $\alpha_1$). Correspondingly, as shown in FIG. 3C, the vertically polarized light undergoes a rotation of $\mu_2$, which is distinct from the rotation angles to or $\mu_1$ (FIG. 3A-3B); and the horizontally polarized light undergoes a rotation of $\omega_2$, which is distinct from the rotations $\omega_0$ and $\omega_1$ (FIG. 3A-3B).

Similarly, the projections of the rotated polarized light on the projection plane of the analyzer or wave plate 125 also change as a function of rotation angles $\mu_2$ and $\omega_2$; and therefore as a function of bend angle $\alpha_1$. The projections can be compared to the projections pre-characterized without bend in the channel, to determine a bend angle of the channel 120 (e.g., bend angle $\alpha_2$, FIG. 2C).

Figure 4A:
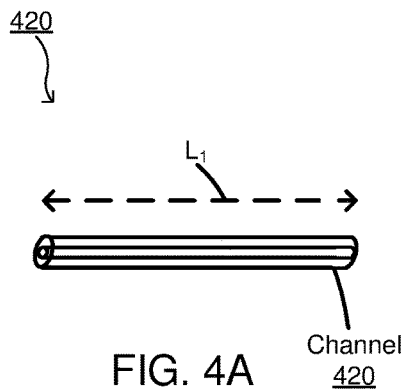
FIGS. 4A-4C illustrate a birefringence deformation sensing apparatus with a multi-core propagation channel, with bends at different points along a length-axis of the propagation channel, in accordance with one or more embodiments.
Figure 4B:
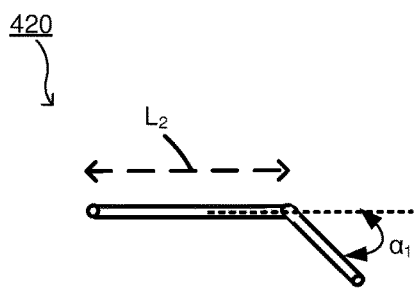
Figure 4C:
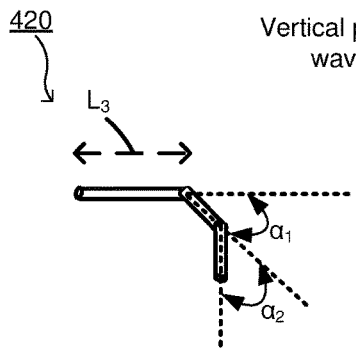
Figure 4D:
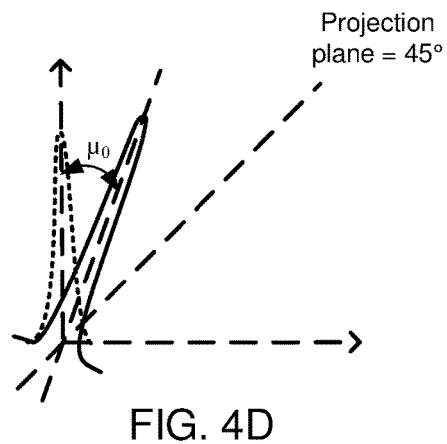
FIGS. 4D-4F illustrate received signals measured from the birefringence deformation sensing apparatus with deformations applied as illustrated in FIGS. 4A-4C, in accordance with one or more embodiments.
Figure 4E:
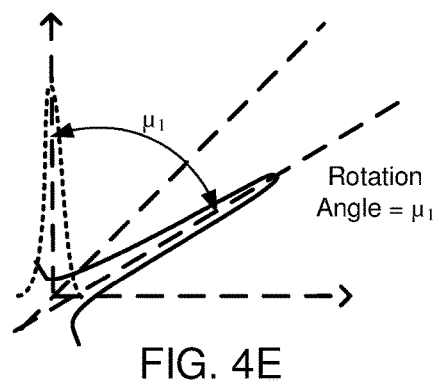
Figure 4F:
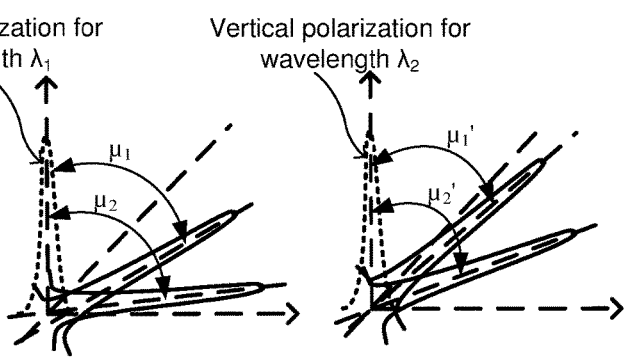

FIGS. 4A-4C illustrate a birefringence deformation sensing apparatus with a multi-core propagation channel 420, with bends at different points along a length-axis of the propagation channel, in accordance with one or more embodiments. FIGS. 4D-4F illustrate received signals measured from the birefringence deformation sensing apparatus with deformations applied as illustrated in FIGS. 4A-4C, in accordance with one or more embodiments.

In one embodiment of a multicore propagation channel as shown in FIG. 4A, the inner channel and outer channel would experience the same total stress under simple elongation of the length $L_1$ to $L_1'$, where $L_1'=L_1+\Delta L$, and thus yield the same change in light polarization along the light path. This same fiber, when bent, would be subjected to different magnitudes of stress in the inner and outer channels (outer channel would see much more stress); thus in bending the stress polarization effects would be much stronger for light in the outer channel than for the inner channel. This embodiment would allow the system to disambiguate bending and tensile loads on the fiber.

In another embodiment of the multicore propagation channel, each channel (inner and outer) is constructed of two materials depending on position along the fiber. For example, the outer channel could be made of low stress birefringent material for the first half of the length $L_1$ and a high stress birefringent material for the second half of the length $L_1$ (the inner channel could mirror this configuration). With this arrangement, polarization changes in each channel indicate stresses in different regions of the fiber along the length as shown in FIGS. 4C and 4F.

In some embodiments, the propagation channel 420 has multiple cores, for instance, each with a different refractive index. Different sets of polarized waves can be transmitted through the different cores and multiple bend angles concurrently present at different locations along the multi-core channel 420 can be computed.

Figure 5:
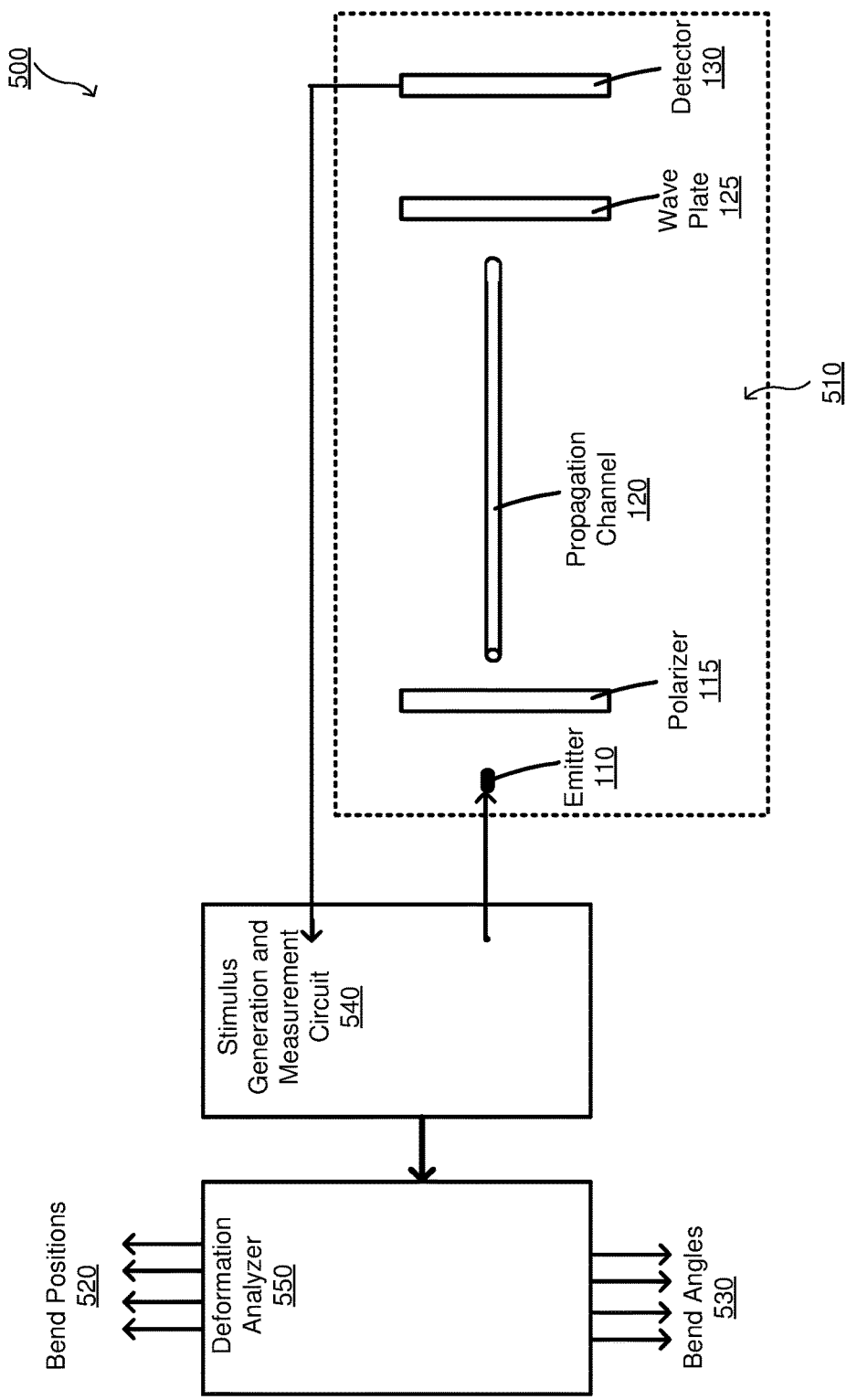
FIG. 5 illustrates a deformation sensing system including a birefringence deformation sensing apparatus, according to one or more embodiments.

FIG. 5 illustrates a deformation sensing system 500 including a birefringence deformation sensing apparatus 510, according to one or more embodiments.

As illustrated in FIG. 5, deformation sensing system 500 includes the birefringence deformation sensing apparatus 510, a stimulus generation and measurement circuit 540, and a deformation analyzer 550. The stimulus generation and measurement circuit 540 and deformation analyzer 550 may be referred to as a controller. In some embodiments, the controller is part of the birefringence deformation sensing apparatus 510.

In some embodiments, and as illustrated in FIG. 5, the birefringence deformation apparatus 510 comprises an emitter 110 which produces electromagnetic radiation (e.g., visible light) in response to stimulus signals from the stimulus generation and measurement circuit 540. The birefringence deformation apparatus 510 further comprises a polarizer 115, propagation channel 120, wave plate 125, and detector 130, as explained with reference to FIGS. 1A-1C. Light sensed by the detector 130 is received by the stimulus generation and measurement circuit 540. Signals received from the stimulus generation and measurement circuit 540 corresponding to the light sensed at the detector 130 are analyzed by the deformation analyzer 550 to determine bend positions 520 and/or bend angles 530, as explained with reference to FIGS. 2A-2C and 3A-3C.

FIGS. 6A-6D include illustrations of a bend angle sensor worn on a finger and comprising one or more birefringence deformation sensors, according to one or more embodiments.

FIGS. 6E-6H illustrate amplitudes and timings of reflected waves within propagation channels of the birefringence deformation sensors, illustrated in FIGS. 6A-6D, respectively, for measuring bend locations and bend angles of different joints of the finger, according to one or more embodiments.

In some embodiments, the use of a birefringence sensor, for instance, in a wearable device is beneficial within a region of the wearable device that internally undergoes different measures of bends, along the different portions of the sensor. For instance, a body part (such as a finger) may bend at one or more locations along a length of a channel of the sensor. In such cases, a location and measure (angle) of bending can be more precisely resolved based on the characteristics (e.g., rotation) of a polarized wave transmitted through the propagation channel that undergoes one or more bends.

As illustrated in FIGS. 6A-6D, a contour of the birefringence deformation sensor 100 undergoes modifications as a function of a location and angle of bending of the finger. In some embodiments, the propagation channel is formed over regions of the finger (or other body part) that are most likely to undergo a bend (e.g., over articulating joints like the finger knuckles). The emitters and/or detectors (emitter 110 and/or detector 130) are optionally positioned in portions of the finger (or other body part) least likely to undergo bends (e.g., over the finger segments formed between the knuckles).

In some embodiments, the locations of bends and bend angles of each individual joint (e.g., individual angles $\rho_{21}$, $\rho_{22}$, $\rho_{23}$ illustrated in FIG. 6C, or individual angles $\rho_{31}$, $\rho_{32}$, $\rho_{33}$ illustrated in FIG. 6D) may individually be resolved based on the characteristics (e.g., rotation angles) of the polarized waves. For instance, as illustrated in FIGS. 6E-6H, the orientation (angle of rotation) of the polarized waves (e.g., measured relative to projection plane) are used to determine one or more bend angles.

As one example, and as shown in FIG. 6G versus 6H, the rotation angles ($\mu_1$, $\mu_2$, $\mu_3$ in FIG. 6G; versus $\mu_1'$, $\mu_2'$, $\mu_3'$ in FIG. 6H, respectively) of each of the three rotational components increases as the corresponding bend deformation (in FIG. 6C versus FIG. 6D) increases; and can be resolved along the projection plane to compute the respective rotation angles and bend angles.

Alternatively, or in addition, in some embodiments, a bend angle (e.g., $\rho_1$, $\rho_2$, $\rho_3$) of the entire finger is computed based on the deformations of different portions of the birefringence deformation sensor, by combining the location and angles of the individual bends.

Figure 7:
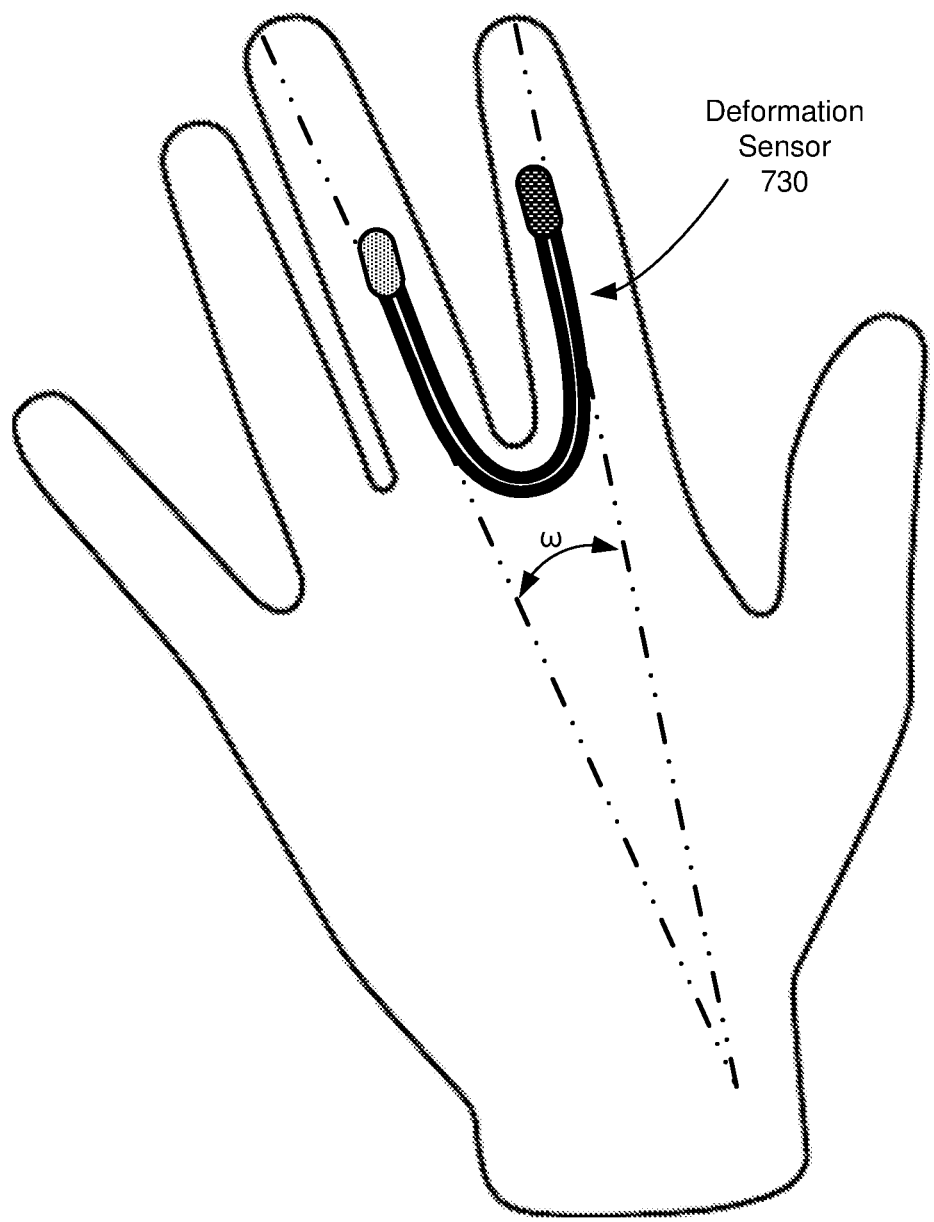
FIG. 7 illustrates an application of a birefringence deformation sensor for measuring an angle between two fingers, according to one or more embodiments.

FIG. 7 illustrates an application of a birefringence deformation sensor 730 for measuring an angle between two fingers, according to one or more embodiments. As shown in FIG. 7, a deformation sensor 730 is placed to follow the curved path between two fingers to measure the adduction/abduction between two fingers (i.e. spread between fingers), shown as angle ω between two fingers.

As illustrated in FIG. 7, a birefringence deformation sensor 730 is positioned along a length of a first finger, bent, and coupled to a second finger. Signals from deformation sensor 730 coupled to the first and second fingers can be used to determine an angular separation (e.g., angle ω) between the first finger and the second finger, in accordance with one or more embodiments. The birefringence deformation sensor 730 may be provided within a wearable glove to be worn around the hand.

FIGS. 8-11 illustrate examples of wearable systems that include one or more birefringence deformation sensors, according to one or more embodiments.

In one or more embodiments, a wearable device or system comprises one or more birefringence deformation sensors (such as those explained with reference to FIGS. 1-7). The wearable device or system may also include the stimulus generation and measurement circuit and deformation analyzer (explained with reference to FIG. 5). Alternatively, the wearable device may include the deformation sensor (and optionally the stimulus generation and measurement circuit) and the received signals may be sent to a remote (e.g., non-wearable) system or device; the remote system or device may include the measurement circuit and/or the deformation analyzer.

In some embodiments, alignment of the shapes of the propagation channels of the birefringence sensor are configured to circumscribe or surround one or more articulating joints. As a result, when the wearable device is positioned or worn around the joints, a movement of the joints results in a corresponding deformation of different portions of the birefringence deformation sensor and a rotation of polarized waves transmitted through the sensor arising from bends in the joints, responsive to an injected polarized signal. Then, using the approaches described herein, a location and/or angle of bend deformation of the different joints can be resolved and independently determined based on the rotation angles of the polarized signals.

Figure 8:
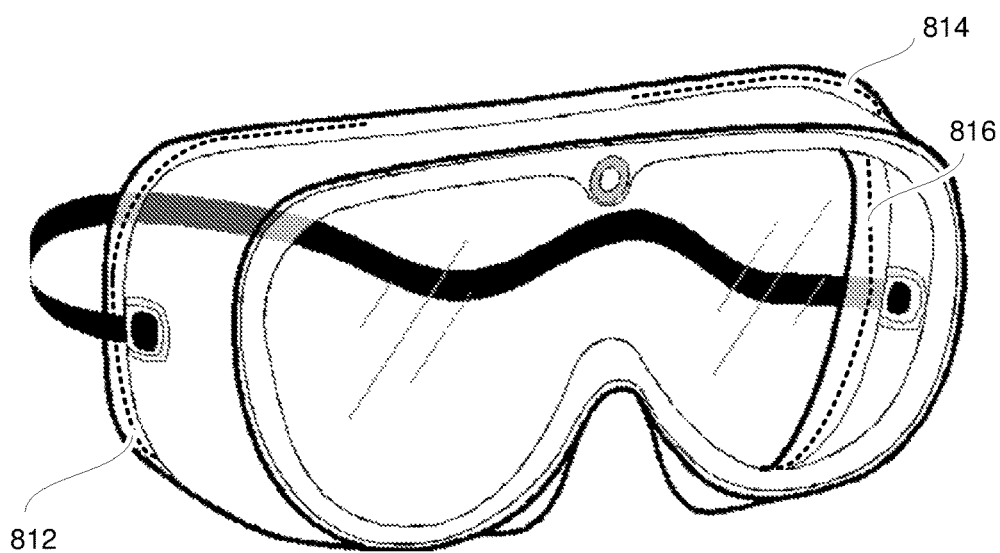
FIGS. 8-11 illustrate examples of wearable systems that include one or more birefringence deformation sensors, according to one or more embodiments.
Figure 9:
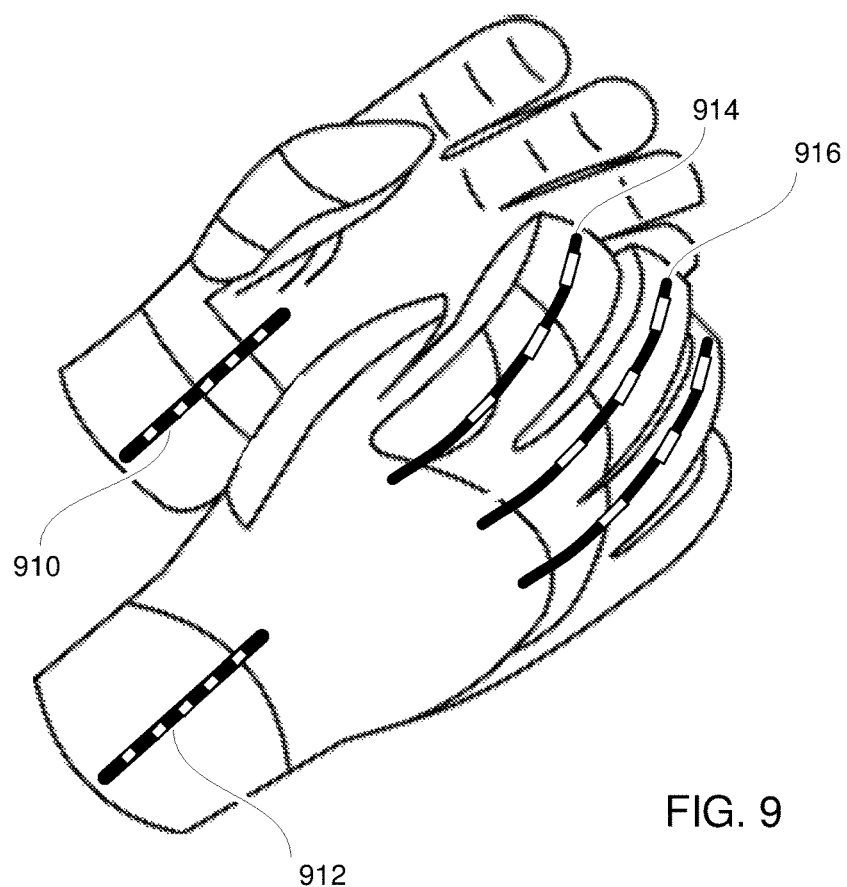
Figure 10:
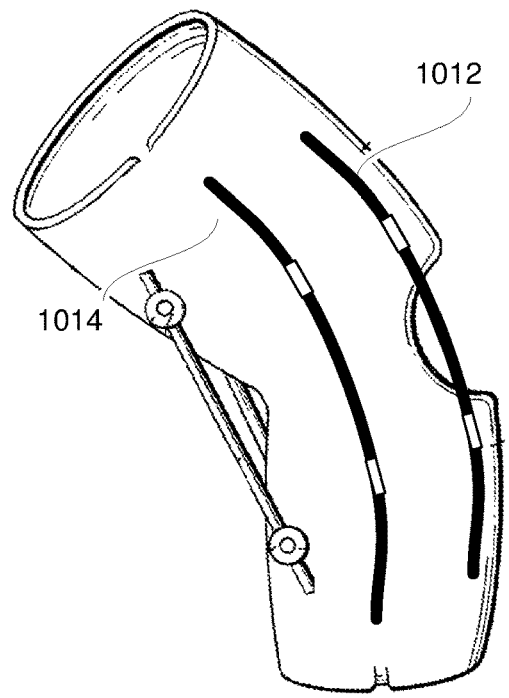

In some embodiments, the wearable device is a wearable headset (e.g., in FIG. 8) to be worn around a portion of the face. Correspondingly, the birefringence deformation sensors 812, 814, 816 are arranged to be substantially concentric with (circumscribing) sockets of the eyes or aligned with portions of the forehead and cheek bone as shown in FIG. 8, thus sensing movements of these spatial regions of these body parts.

In some embodiments, the wearable device is a glove (e.g., in FIG. 9) to be worn around the hand or a cover (e.g., thimble or guard band) to be worn over a finger or wrist. Correspondingly, the birefringence deformation sensor is arranged to be substantially aligned with joints of one or more fingers (914 and 916) or the wrist joint (910 and 912) when the device is worn around the fingers or wrist. Alternatively or in addition, the birefringence deformation sensor is arranged to be above, below, or on a side of one or more joints.

In some embodiments, the wearable device is a brace (e.g., in FIG. 10) to be worn over a knee, elbow, ankle, or shoulder joint. Correspondingly, the birefringence deformation sensors may be arranged to be substantially along a length of and over the knee (1012), elbow, ankle, or shoulder joint. Alternatively, or in addition, the birefringence deformation sensor may be arranged to be above, below, or on a side (1014) of the joint.

Figure 11:
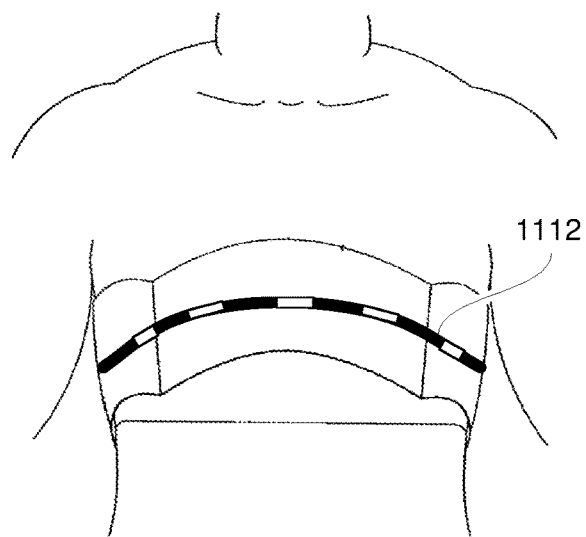

In some embodiments, the wearable device is a support brace to be worn over a neck or torso part (e.g., chest, back, or waist; as shown in FIG. 11). Correspondingly, the birefringence deformation sensor is arranged to be follow a contour of the neck or torso part (e.g., 1112).

In one or more embodiments, the disclosed approaches, systems, and methods for spatially resolving deformation (e.g., sensing bend locations, bend angles, and angular separations) are used in conjunction with a virtual reality (VR) system. For example, the disclosed approaches for detecting bends of body parts, bend angles, and angular separations of fingers or other body parts are used to provide information about or to render a state of the hand (or other body part) in a VR environment or VR world. For example, states of a hand (e.g., open, closed, pointing, gesturing, etc.) can be determined based on the detected disposition of fingers of the hand.

Embodiments of the invention may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, e.g., create content in an artificial reality and/or are otherwise used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

Additional Configuration Information

The figures depict various embodiments of the present invention for purposes of illustration only. One skilled in the art will readily recognize from the following discussion that alternative embodiments of the structures and methods illustrated herein may be employed without departing from the principles of the invention described herein.

The foregoing description of the embodiments has been presented for the purpose of illustration; it is not intended to be exhaustive or to limit the embodiments to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Some embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Some embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the embodiments be limited not by this detailed description, but rather by any claims that issue on an application based hereon. Accordingly, the disclosure of the embodiments is intended to be illustrative, but not limiting, of the scope of the embodiments, which is set forth in the following claims.

What is claimed is:

1. A deformation sensing apparatus comprising:
    a propagation channel that is deformable;
    a transmitter coupled to a first end of the propagation channel;
    a receiver coupled to a second end of the propagation channel; and
    a controller configured to instruct the transmitter to transmit a signal, instruct the receiver to capture one or more measurements of the transmitted signal, and determine a bend in the propagation channel based on the one or more measurements.

2. The deformation sensing apparatus of claim 1, wherein the transmitter is a light source, the propagation channel is an optical fiber, and the receiver is a photodiode.

3. The deformation sensing apparatus of claim 1, wherein the propagation channel comprises a material that has a variation in a refractive index responsive to applied mechanical stress.

4. The deformation sensing apparatus of claim 1, further comprising a polarizer positioned between the transmitter and the propagation channel.

5. The deformation sensing apparatus of claim 4, further comprising a wave plate positioned between the propagation channel and the receiver.

6. The deformation sensing apparatus of claim 5, wherein the polarizer is configured to polarize light into a vertical polarization direction and a horizontal polarization direction and the wave plate is rotated at a 45 degree angle to the vertical polarization direction and the horizontal polarization direction.

7. The deformation sensing apparatus of claim 6, wherein the one or more measurements is a vertical polarization vector and a horizontal polarization vector and the controller is configured to analyze each vector along an axis of the wave plate to obtain a vertical rotation angle and a horizontal rotation angle.

8. The deformation sensing apparatus of claim 7, wherein the controller compares the vertical rotation angle and the horizontal rotation angle to a corresponding vertical rotation angle and a corresponding horizontal rotation angle of a corresponding propagation channel that is not bent to determine the bend of the propagation channel.

9. The deformation sensing apparatus of claim 1, wherein the propagation channel is a multi-core fiber.

10. The deformation sensing apparatus of claim 9, wherein the controller instructs the transmitter to transmit different sets of polarized waves through different cores of the multi-core fiber, instructs the receiver to capture multiple measurements of the transmitted signal, and determines multiple bend angles in the propagation channel based on the multiple measurements.

11. The deformation sensing apparatus of claim 1, wherein the deformation sensing apparatus is part of a wearable device configured to be worn around a body part of a user to determine a state of the body part.

12. The deformation sensing apparatus of claim 11, wherein the deformation sensing apparatus is part of a glove.

13. The deformation sensing apparatus of claim 11, wherein the wearable device is a head mounted display and the deformation sensing apparatus is arranged to be concentric with sockets of eyes of the user.

14. The deformation sensing apparatus of claim 11, wherein the wearable device is a head mounted display and the deformation sensing apparatus is arranged to be aligned with portions of a forehead and a cheek bone of the user.

15. The deformation sensing apparatus of claim 11, wherein the wearable device is a cover to be worn over a finger or a wrist of the user.

16. The deformation sensing apparatus of claim 11, wherein the wearable device is a brace to be worn over a knee, elbow, ankle, or shoulder joint of the user.

17. The deformation sensing apparatus of claim 11, wherein the wearable device is a support brace to be worn over a neck, back, chest, or waist.

18. The deformation sensing apparatus of claim 11, wherein the determined state of the body part is used to render a state of a body part in a virtual reality environment.

* * * * *